United States Patent
Mayer

(10) Patent No.: US 7,206,926 B2
(45) Date of Patent: Apr. 17, 2007

(54) PROGRAMMABLE UNIT INCLUDING PROGRAM OPERATION UNIT AND ASSOCIATED STOPPING DEVICE

(75) Inventor: Albrecht Mayer, Deisenhofen (DE)

(73) Assignee: Infineon Technologies AG, München (DE)

( * ) Notice: Subject to any disclaimer, the term of this patent is extended or adjusted under 35 U.S.C. 154(b) by 612 days.

(21) Appl. No.: 09/974,924

(22) Filed: Oct. 10, 2001

(65) Prior Publication Data

US 2002/0042873 A1    Apr. 11, 2002

(30) Foreign Application Priority Data

Oct. 10, 2000  (DE)  ................. 100 50 011

(51) Int. Cl.
*G06F 9/44*  (2006.01)
(52) U.S. Cl. .................................. 712/227
(58) Field of Classification Search ........... 712/227, 712/37, 244
See application file for complete search history.

(56) References Cited

U.S. PATENT DOCUMENTS

| | | | |
|---|---|---|---|
| 4,456,951 A | | 6/1984 | Henneberger et al. |
| 4,502,116 A | * | 2/1985 | Fowler et al. ............. 714/4 |
| 5,678,003 A | | 10/1997 | Brooks |
| 5,956,514 A | * | 9/1999 | Wen et al. ................. 717/127 |
| 6,349,392 B1 | * | 2/2002 | Swoboda et al. ........... 714/30 |
| 6,629,178 B1 | * | 9/2003 | Smith ........................ 710/240 |
| 2002/0129184 A1 | * | 9/2002 | Watanabe ................... 710/240 |

FOREIGN PATENT DOCUMENTS

| | | | |
|---|---|---|---|
| DE | 0 455 946 | * | 11/1991 |
| EP | 0 683 455 B1 | | 11/1995 |
| JP | 63 085 942 A | | 4/1988 |

OTHER PUBLICATIONS

Hennessy, John; Patterson, David. Computer Organization and Design: the hardware/software interface. Morgan Kaufmann Publishers. 2nd Edition. pp. 658-659.*
The American Heritage College Dictionary, 4th Edition. Houghton Mifflin Company, 2002. pp. 97, 723, and 1036.*

* cited by examiner

*Primary Examiner*—Richard L. Ellis
*Assistant Examiner*—Ryan Fiegle
(74) *Attorney, Agent, or Firm*—Laurence A. Greenberg; Werner H. Stemer; Ralph E. Locher

(57) ABSTRACT

A programmable unit is described having one or more program running units for running a program, with at least one of the program running units having an associated stopping device by which it is possible to stop the running of the program by the program running unit with which that stopping device is associated. The described programmable unit is distinguished in that the stopping device can also cause other components of the programmable unit to be stopped, in addition to the program running unit with which it is associated.

17 Claims, 1 Drawing Sheet

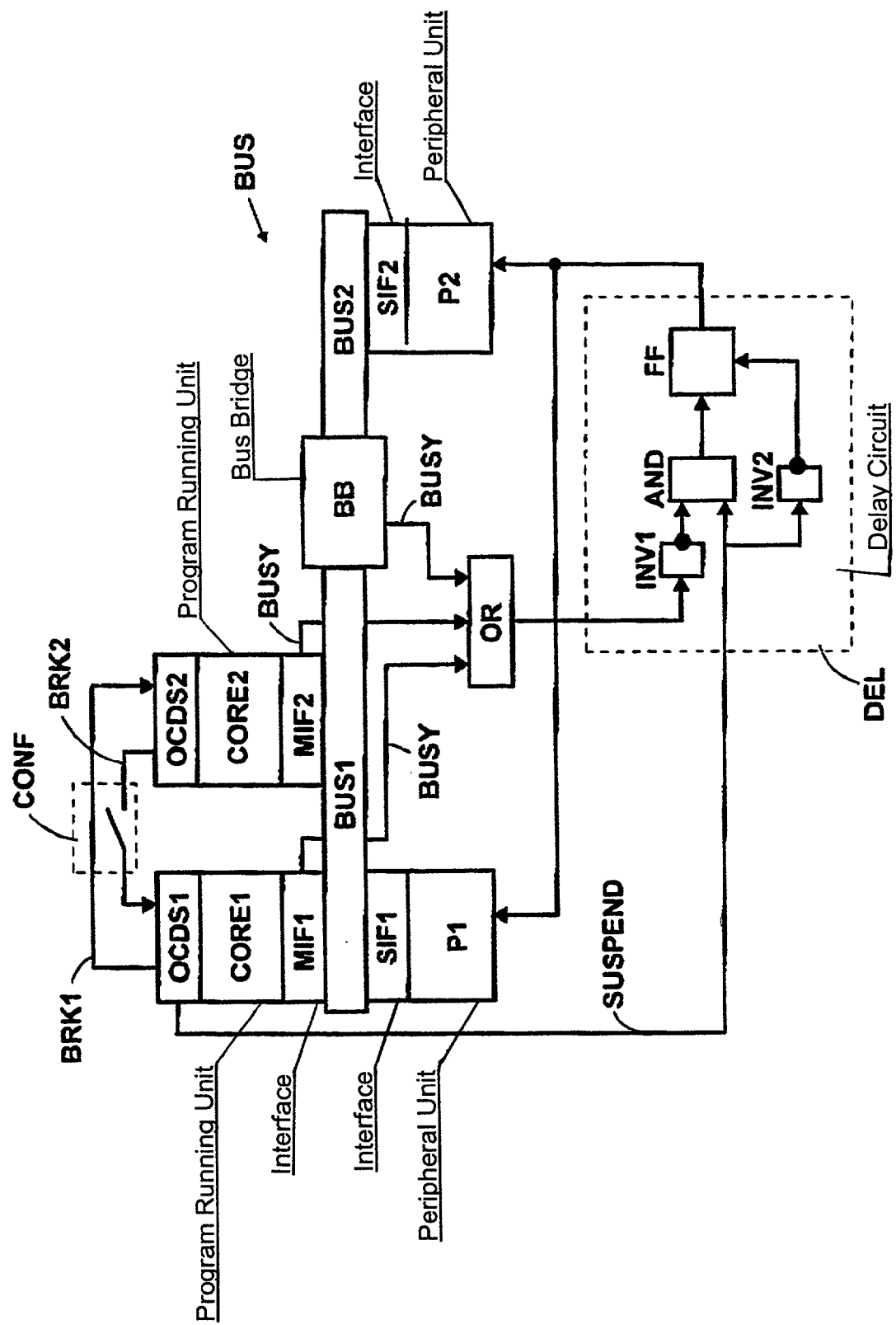

PROGRAMMABLE UNIT INCLUDING PROGRAM OPERATION UNIT AND ASSOCIATED STOPPING DEVICE

BACKGROUND OF THE INVENTION

Field of the Invention

The present invention relates to an apparatus being a programmable unit having one or more program running units for running a program, with at least one of the program running units having an associated stopping device by which it is possible to stop the running of the program by the program running unit with which that stopping device is associated.

Programmable units of this type include, for example, microprocessors, microcontrollers, signal processors, etc.

The stopping device by which program running can be stopped by a program running unit, which runs a program, in the programmable unit is, for example, what is referred to as an on-chip debug support (OCDS) module.

OCDS modules have the capability to monitor for the occurrence of specific events (breakpoints) for example access to a specific address in the program memory or in the data memory, the execution of a specific command, the reading or writing of specific data from or to a memory, respectively, and, in response to the occurrence of the event, to stop the program being run by the program running unit with which it is associated.

Once program running has been stopped, an external debugger can investigate the stopped programmable unit and/or the system containing the unit for any possible causes of incorrect operation, and/or—for example by varying the register contents—to change it to a specific state.

Particularly, but not exclusively, in the last-mentioned case, the programmable unit can then continue to run again in order to continue the fault tracing process or to check for the effects of the changes made.

Since the configuration of the programmable units and the systems containing them is becoming ever more complex, situations have now occurred, however, in which the programmable unit has not continued to run as it should have done if program running had not been stopped, when the program running was continued, even if no permanent changes have been made while the running of the program was stopped. Therefore, faults that occur in such programmable units or systems cannot be identified and analyzed, or can be identified and analyzed only to a limited extent.

SUMMARY OF THE INVENTION

It is accordingly an object of the invention to provide a programmable unit which overcomes the above-mentioned disadvantages of the prior art devices of this general type, in which, at least when no manipulations, or in any case when no manipulations which cannot be reversed, have been carried out in it while the running of the program was stopped, it will continue to run in all circumstances, when the running of the program is continued, precisely as they would have done if the running of the program had not been stopped.

With the foregoing and other objects in view there is provided, in accordance with the invention, a programmable unit. The programmable unit contains at least one program running unit for running a program, and a stopping device connected to the program running unit. The stopping device is configured to stop the running of the program by the program running unit. Other components are connected to the stopping device, the stopping device also causing the other components to be stopped, in addition to stopping the program running unit with which the stopping device is associated.

The programmable units according to the invention are distinguished in that the stopping device can also cause other components of the programmable unit to be stopped, in addition to the program running unit with which it is associated.

Since not only the program running unit which is running the program but also further components of the programmable unit, in particular further program running units and/or components of the programmable unit which cooperate with the program running units to be stopped are stopped when the running of the program is stopped, it is possible for nothing to be changed, while the program running unit is stopped, which has an influence, or could have an influence, on the subsequent continuation of the running of the program and/or the results obtained in this case.

Provided no permanent changes have been made deliberately in the programmable unit while the running of the program was stopped, a programmable unit configured as claimed can reliably continue running after the running of the program has been stopped as it would have done if it had not been stopped.

In accordance with an added feature of the invention, the other components which can be stopped by the stopping device include units which are connected to and cooperate with the program running unit and the further program running unit. The units are stopped by the stopping device later in time than the program running unit and the further program running unit.

In accordance with an additional feature of the invention, at least one bus is provided, and components that can be stopped by the stopping device are at least partially connected to one another through the bus.

In accordance with another feature of the invention, bus interfaces are provided and each of the bus interfaces is connected to one of the program running unit and the further program running unit and to the bus. The program running unit and the further program running unit function as bus masters. The units are stopped only when the bus masters and the bus interfaces have no more data to output and/or are no longer waiting for already requested data or data that is still to be requested.

In accordance with a further feature of the invention, the bus includes a first bus part, a second bus part and a bus bridge connecting the first bus part to the second bus part. The units are stopped only when the bus bridge has no more data to pass on.

In accordance with a further added feature of the invention, after a stopped state of components of the programmable unit which have been stopped is cancelled, the units recommence operation before the program running unit and the further program running unit recommence operation.

In accordance with another additional feature of the invention, the units function as bus slaves and after a stopped state of components which have been stopped is cancelled, only the bus slaves recommencing operation, and the bus masters recommencing operation only after the bus slaves have recommenced operation.

In accordance with a concomitant feature of the invention, the stopping device is an on-chip debug support module.

Other features which are considered as characteristic for the invention are set forth in the appended claims.

Although the invention is illustrated and described herein as embodied in a programmable unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and with reference to the FIGURE.

DESCRIPTION OF THE DRAWING

The single FIGURE of the drawing is a block diagram of a programmable unit according to the invention.

DESCRIPTION OF THE PREFERRED EMBODIMENTS

Referring now to the single FIGURE of the drawing in detail, there is shown a programmable unit that in the example under consideration is a microcontroller. However, it should actually be mentioned at this point that this does not represent any restriction. The special features of the programmable unit described in the following text can also be used for any other program-controlled purpose.

For the sake of completeness, it should be mentioned that only those components of the programmable unit under consideration, which are of particular interest in the present case are illustrated and described.

As can be seen from the FIGURE, the programmable unit under consideration contains a first program running unit CORE1, an on-chip debug support (OCDS) module OCDS1 which is associated with the first program running unit CORE1, and a master interface MIF1 which is associated with the first program running unit CORE1, for connection to a bus BUS. The programmable unit has a second program running unit CORE2, an on-chip debug support module OCDS2 which is associated with the second program running unit CORE2, and a master interface MIF2, which is associated with the second program running unit CORE2, for connection to the already mentioned bus BUS. A first peripheral unit P1 and a slave interface SIF1, which is associated with the first peripheral unit P1, for connection to the already mentioned bus BUS, are provided. The programmable unit has a second peripheral unit P2 and a slave interface SIF2, which is associated with the second peripheral unit P2, for connection to the already mentioned bus BUS. The bus BUS which has already been mentioned a number of times, has a first bus part BUS1, a second bus part BUS2, and a bus bridge BB which connects the bus parts BUS1 and BUS2 to one another. A stopping configuration apparatus CONF, and a stopping delay apparatus DEL are also provided.

The first program running unit CORE1 and the second program running unit CORE2 run the same program or different programs independently of one another.

The peripheral units P1 and P2 are, for example, A/D converters, timers, DMA controllers or other units, which can be used in programmable units in addition to one or more program running units, and cooperate with them.

The bus bridge BB is used for connecting the bus parts BUS1 and BUS2. Bus bridges are provided in order that the line capacities, which interfere with data transmission can be kept low, and/or in order that buses or bus parts, which operate at different speeds and/or are constructed or operated differently can be coupled to one another. The bus bridge BB receives data from the bus part BUS1 and passes it on to the bus part BUS2 while, conversely, it receives data from the bus part BUS2 and passes it on to the bus part BUS1; the data to be passed on is normally buffer-stored in a buffer.

The OCDS modules OCDS1 and OCDS2, which are associated with the program running units allow the program running units with which they are associated to be debugged by an external debugger.

The characteristic of the OCDS modules OCDS1 and OCDS2 that is of particular interest in the present case is that they can be used as a stopping device for stopping the running of the program by the program running unit with which they are associated. The OCDS modules have the capability to monitor for the occurrence of specific events (breakpoints) in the program running units with which they are associated, for example the access to a specific address in the program memory or in the data memory, the execution of a specific command, the reading or writing of specific data from and to a memory, respectively, and, in response to the occurrence of the event, to stop the program being run by the program running unit with which they are associated. To this extent, they are no different then conventional OCDS modules.

In the example under consideration, the stopping devices formed by the OCDS modules OCDS1 and OCDS2 furthermore have the characteristic that they can also stop other components of the programmable unit in addition to the program running unit CORE1, CORE2 with which they are in each case associated.

In the example under consideration, the other components includes one or more program running units with which no stopping device or another stopping device initiating the stopping of the running of the program is associated, and one or more units of the programmable unit which cooperate with the program running units.

In the example under consideration the first OCDS module OCDS1 can also stop the second program running unit CORE2 as well as the first peripheral unit P1 and the second peripheral unit P2 in addition to the first program running unit CORE1 with which it is associated. The second OCDS module OCDS2 can also stop the first program running unit CORE1, in addition to the second program running unit CORE2 with which it is associated.

The trigger for the second OCDS module OCDS2 to stop the second program running unit CORE2 and the first program running unit CORE1 occurs when it finds that a breakpoint condition is satisfied by the second program running unit CORE2.

The trigger for the first OCDS module OCDS1 to stop the first program running unit CORE1, the second program running unit CORE2 and the peripheral units P1 and P2 occurs when the first OCDS module OCDS1 finds that a breakpoint condition is satisfied by the first programming running unit CORE1. It is also possible (but not necessary) for the first OCDS module OCDS1 to stop the first peripheral unit P1 and the second peripheral unit P2 in the situation where the second OCDS module OCDS2 causes it to stop the first program running unit CORE1. It is preferably possible to use the first OCDS module OCDS1 to select whether this is the case.

The second program running unit CORE2 is stopped by the first OCDS module OCDS1 by a signal BRK1 which the first OCDS module OCDS1 emits to the second OCDS module OCDS2, and which the second OCDS module OCDS2 uses to stop the second program running unit CORE2. The first program running unit CORE1 is stopped by the second OCDS module OCDS2 by a signal BRK2 which the second OCDS module OCDS2 emits to the first OCDS module OCDS1, and which the first OCDS module OCDS1 uses to stop the first program running unit CORE1. For the sake of completeness, it should be mentioned that the signals BRK1 and BRK2 can also be supplied directly to the program running unit which they are intended to stop; this also makes it possible to stop program running units which have no associated OCDS module.

On their way to the OCDS modules for which they are intended, the signals BRK1 and BRK2 pass through the stopping configuration apparatus CONF. The stopping configuration apparatus CONF contains switching elements via which it is possible to select whether the signal BRK1 is passed on to the second OCDS module OCDS2, and/or whether the signal BRK2 is passed on to the first OCDS module OCDS1.

The peripheral units P1 and P2 are stopped by the first OCDS module OCDS1 emitting a signal SUSPEND=1. The suspend signal SUSPEND is emitted, for example, at the time at which the program running units CORE1 and/or CORE2 are stopped, and is supplied to the stopping delay apparatus DEL. The stopping delay apparatus DEL passes the signal on, with a specific delay, to the peripheral units P1 and P2, and in consequence stops them. The delaying of passing on of the SUSPEND signal to the peripheral units P1 and P2 results in that they are not stopped until a certain amount of time has passed from the time at which the program running units were stopped.

The delayed stopping of the peripheral units P1 and P2 results in a number of advantages, which will be described in more detail later on.

In the example under consideration, the SUSPEND signal is passed on to the peripheral units P1 and P2 when it is found that those components of the programmable units which may be a bus master, and the bus bridge BB, have no more data to output and/or are no longer waiting for any requested data or for any data still to be requested.

In the example under consideration, those components, which may be a bus master are the program running units CORE1 and CORE2; the remaining units of the units (the peripheral units P1 and P2) which are connected to the bus BUS may be only slaves. Thus, in the example under consideration, the first program running unit CORE1, the second program running unit CORE2 and the bus bridge BB are checked to determine whether they still have any data to output and/or whether they are waiting for data that has already been requested or is still to be requested.

The check is carried out by a BUSY signal, which is emitted by the first program running unit CORE1 (and/or the interface MIF1 associated with it), the second program running unit CORE2 (and/or the interface MIF2 associated with it) and the bus bridge BB. The BUSY signal indicates to the units whether they still have any data to output and/or whether they are waiting for any already requested data or for any data still to be requested. In the example under consideration, the BUSY signals in each case have the value 1 when the respective unit still has data to output and/or is waiting for already requested data or data that is still to be requested, and the value 0 when the respective unit has no data to output and/or is no longer waiting for any already requested data or data still to be requested.

The BUSY signals from the first program running unit CORE1 (and/or from the interface MIF1 associated with it), the second program running unit CORE2 (and/or the interface MIF2 associated with it) and the bus bridge BB are subjected to an OR logic operation by an OR gate OR. The output signal from the OR-gate OR is supplied to the stopping delay apparatus DEL.

The stopping delay apparatus DEL contains a first inverter INV1, a second inverter INV2, an AND gate AND and a flipflop FF. The first inverter INV1 inverts the output signal from the OR gate OR. The second inverter INV2 inverts the SUSPEND signal supplied to the stopping delay apparatus DEL. The AND gate AND subjects the output signal from the first inverter INV1 and the (not inverted) SUSPEND signal, which is supplied to the stopping delay apparatus DEL, to an AND logic operation, and the flip-flop FF is set by the output signal from the AND gate AND and being reset by the output signal from the second inverter INV2, and the SUSPEND signal which stops the peripheral units P1 and P2 being emitted to them.

As is easy to comprehend, the stopping delay apparatus DEL emits a SUSPEND signal (SUSPEND=1), which stops the peripheral units P1 and P2, only when it is supplied with a signal SUSPEND=1, and all the signals BUSY from the program running units CORE1 and CORE2 (and/or from the interfaces MIF1 and MIF2 associated with them) as well as from the bus bridge BB have the value 0.

The delayed stopping of the peripheral units P1 and P2 gives the program running units CORE1 and CORE2, or other bus masters, the opportunity to carry out other write or read access operations, which have already been started or have been defined at the time when program running was stopped (for example to empty what is referred to as the write-back buffer in the program running units). This has been found to be advantageous since, in consequence, the debugging process which follows the stopping of the programmable unit is itself simplified and provides more reliable results on the present state of the programmable unit, and since the programmable unit is in this way changed to a state which ensures that the programmable unit will continue processing correctly once the stop state has been cancelled (that is to say it will continue processing as it would have done if it had not been stopped).

When the programmable unit is intended to continue running once again after stopping and debugging, the signal SUSPEND which was supplied to the stopping delay apparatus DEL is set to the value 0, which results in the flip-flop FF being reset and a signal SUSPEND=0, which no longer stops the peripheral units P1 and P2, being emitted from the stopping delay apparatus DEL, and the stopping of the running of the program by the program running units is then cancelled.

For the sake of completeness, it should be mentioned that, for this purpose, it is not necessary, or is not invariably necessary in all cases, to stop all the program running units in each case. It is likewise not necessary for this purpose, or is not invariably necessary in all cases, to stop all the peripheral units in each case. However, components of the programmable unit, which cannot be prevented from accessing a stopped component should likewise be stopped.

It may be obvious that the special features, described above, of the programmable unit under consideration can also be used—possibly after appropriate modification—when the programmable unit contains more or less than two program running units, every program running unit does not have an associated OCDS module (a stopping device which can stop the associated program running unit), a number of program running units have a single OCDS module (a single stopping device) assigned to them jointly, the programmable unit contains more or less than two peripheral units, the bus masters of the programmable unit are not formed, or are not exclusively formed, by the program running units, and/or when the programmable unit contains no bus bridges or a number of bus bridges.

In the case of programmable units as described, or of similar construction, it is reliably possible to ensure that at least when no manipulations, or in any case no manipulations which have not been reversed again, have been carried out in them while the running of the program was stopped, these units will continue to run, when the running of the program is continued, as they would have done if the running of the program had not been stopped.

I claim:

1. A programmable unit, comprising:
   at least one program operation unit for running a program;
   a stopping device connected to said program operation unit, said stopping device issuing a stop command to said program operation unit to stop the running of the program by said program operation unit, said stopping device being located on the same chip as said program operation unit;
   other components connected to said stopping device, said stop command causing said other components to be stopped, in addition to stopping said program operation unit with which said stopping device is associated, said other components including units which are connected to and cooperate with said program operation unit; and
   a delay apparatus which, in response to receipt of said stop command, deliberately delays the stopping of said units until after the stopping of said program operation unit.

2. The programmable unit according to claim 1, wherein after a stopped state of components of the programmable unit which have been stopped is cancelled, said units recommence operation before said program operation unit and said further program operation unit recommence operation.

3. The programmable unit according to claim 1, wherein said stopping device is an on-chip debug support module.

4. The programmable unit according to claim 1, wherein said other components include said at least one further program operation unit and said stopping device being able to stop said further program operation unit which is not associated with said stopping device.

5. The programmable unit according to claim 4, wherein said units are additionally connected to and cooperate with said further program operation unit.

6. The programmable unit according to claim 5, wherein said units are stopped by said stopping device later in time than said program operation unit and said further program operation unit.

7. The programmable unit according to claim 6, including at least one bus connected between said other components.

8. The programmable unit according to claim 7, including bus interfaces and each of said bus interfaces is connected to one of said program operation unit and said further program operation unit and to said bus, said program operation unit and said further program operation unit function as bus masters, said delay apparatus stopping said units only when said bus masters and said bus interfaces have no more data to output and/or are no longer waiting for already requested data or data that is still to be requested.

9. The programmable unit according to claim 7, wherein said bus includes a first bus part, a second bus part and a bus bridge connecting said first bus part to said second bus part, said delay apparatus stopping said units only when said bus bridge has no more data to pass on.

10. The programmable unit according to claim 8, wherein said units function as bus slaves and after a Stopped state of components which have been stopped is cancelled, only said bus slaves recommencing operation, and said bus masters recommencing operation only after said bus slaves have recommenced operation.

11. A programmable unit, comprising:
    at least one program operation unit for running a program;
    a stopping device connected to said program operation unit, said stopping device issuing a stop command to said at least one program operation unit to stop the running of the program by said program operation unit; and
    peripherals which are not program operation units, connected to said stopping device, said stop command causing said peripherals to be stopped, in addition to stopping said at least one program operation unit with which said stopping device is associated, said peripherals being stopped in response to said stop command after a deliberate delay so that said peripherals are stopped after said at least one program operation unit is stopped.

12. The programmable unit according to claim 11, wherein after a stopped state of peripherals of the programmable unit which have been stopped is cancelled, said peripherals recommence operation before said program operation unit recommences operation.

13. The programmable unit according to claim 11, wherein said stopping device is an on-chip debug support module.

14. The programmable unit according to claim 11, wherein said deliberate delay is determined by said stop command and an indication from at least said at least one program operation unit has no further data to pass on.

15. The programmable unit according to claim 11, including at least one bus connected between said peripherals.

16. The programmable unit according to claim 15, including a bus interface connected to said program operation unit and to said bus said program operation unit functioning as a bus master, said peripherals being stopped only when said bus master and said bus interface have no more data to output and/or are no longer waiting for already requested data or data that is still to be requested.

17. The programmable unit according to claim 16, wherein said bus includes a first bus part, a second bus part and a bus bridge connecting said first bus part to said second bus part, said units are stopped only when said bus bridge has no more, data to pass on.

* * * * *